(12) United States Patent
Gray et al.

(10) Patent No.: US 11,016,688 B1
(45) Date of Patent: May 25, 2021

(54) REAL-TIME LOCALIZED DATA ACCESS IN A DISTRIBUTED DATA STORAGE SYSTEM

(71) Applicant: Open Drives LLC, Culver City, CA (US)

(72) Inventors: Scot Gray, Culver City, CA (US); Sean Lee, Culver City, CA (US)

(73) Assignee: Open Drives LLC, Culver City, CA (US)

( * ) Notice: Subject to any disclaimer, the term of this patent is extended or adjusted under 35 U.S.C. 154(b) by 0 days.

(21) Appl. No.: 17/142,643

(22) Filed: Jan. 6, 2021

(51) Int. Cl.
*G06F 3/06* (2006.01)

(52) U.S. Cl.
CPC ............ *G06F 3/0643* (2013.01); *G06F 3/067* (2013.01); *G06F 3/0611* (2013.01); *G06F 3/0637* (2013.01); *G06F 3/0646* (2013.01)

(58) Field of Classification Search
CPC .... G06F 3/0643; G06F 3/0611; G06F 3/0637; G06F 3/0646; G06F 3/067
See application file for complete search history.

(56) References Cited

U.S. PATENT DOCUMENTS

| | | | | |
|---|---|---|---|---|
| 5,765,204 A * | 6/1998 | Bakke | ...................... | G06F 3/061 711/202 |
| 2003/0110358 A1* | 6/2003 | Goldberg | ............ | G06F 12/0815 711/141 |
| 2010/0318756 A1* | 12/2010 | Yoshinari | ............ | G06F 11/0727 711/162 |
| 2011/0231605 A1* | 9/2011 | Ogawa | .................... | G06F 3/067 711/114 |
| 2017/0005889 A1* | 1/2017 | Hopcraft | ................. | H04L 67/10 |

OTHER PUBLICATIONS

Location-aware Associated Data Placement for Geo-distributed Data-intensive Applications, Boyang Yu and Jianping Pan, University of Victoria, Victoria, BC, Canada. 2015 IEEE Conference.*

\* cited by examiner

*Primary Examiner* — David Yi
*Assistant Examiner* — Tahilba O Puche
(74) *Attorney, Agent, or Firm* — Ansari Katiraei LLP; Arman Katiraei; Sadiq Ansari

(57) ABSTRACT

Disclosed is a distributed storage system and methods for providing real-time localized data access from different storage nodes of the distributed storage system. Providing the localized data access may include tracking access frequencies with which a file is directly accessed from the different storage nodes, storing a source copy of the file at the first storage node in response to the access frequency at the first storage node being greater than the access frequency at the other storage nodes, caching the file at a second storage node, transferring control over the source copy from the first storage node to a third storage node based on a change to the access frequencies, and validating the cached copy of the file at the second storage node against the source copy at the third storage node prior to responding to a request for the file from the second storage node.

19 Claims, 7 Drawing Sheets

REAL-TIME LOCALIZED DATA ACCESS IN A DISTRIBUTED DATA STORAGE SYSTEM

BACKGROUND

The "cloud" may provide virtually unlimited data storage, and may provide convenient access to the stored data from any location or by any device. However, the convenience of cloud storage comes at a performance cost, especially when accessing large files or large amounts of data over a network and/or over large distances. For instance, a high-resolution video file may be several gigabytes in size. Moving that much data from the cloud storage to a local workstation where the video is to be edited may take several minutes.

DETAILED DESCRIPTION OF PREFERRED EMBODIMENTS

Figure 1:
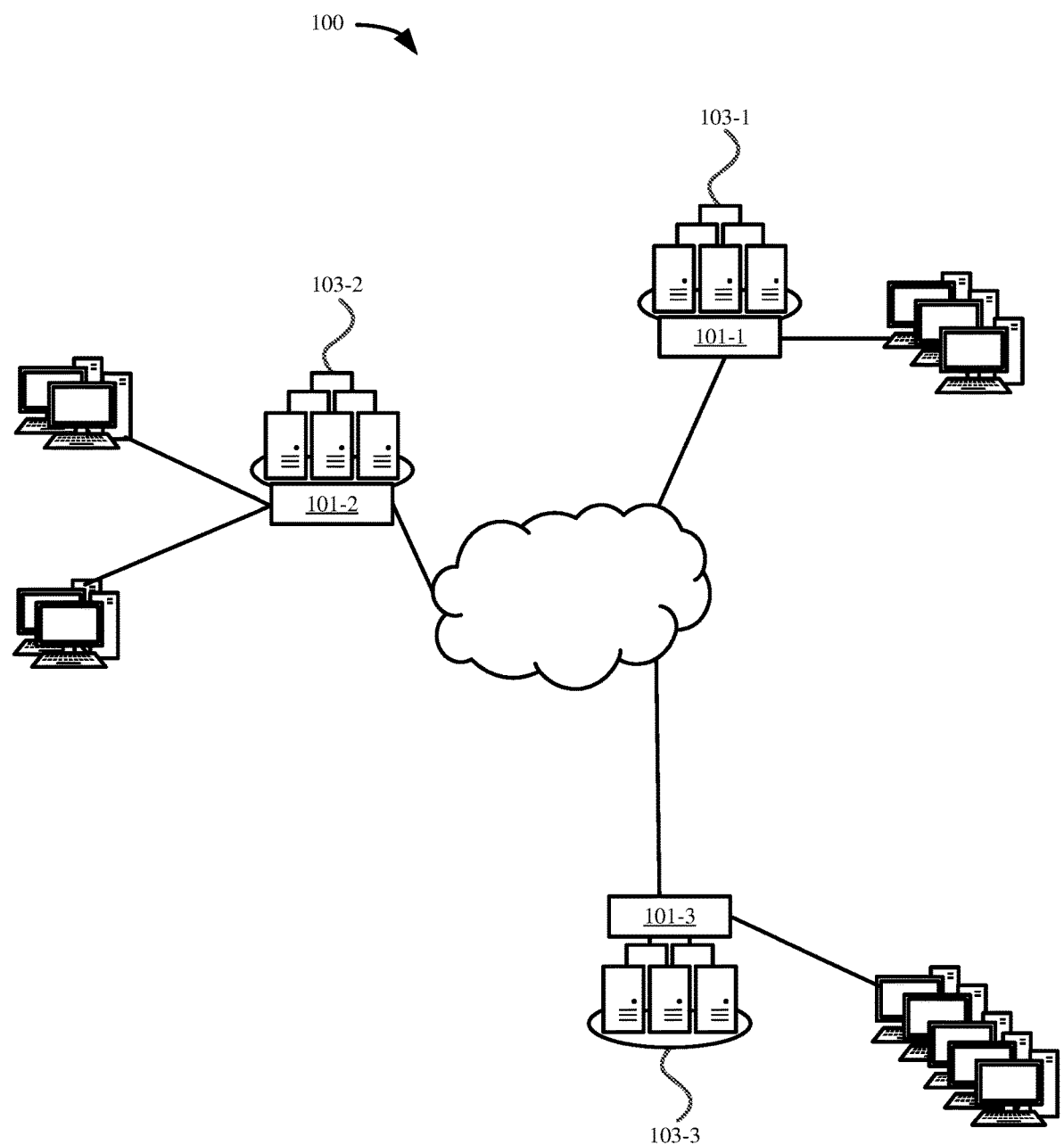
FIG. 1 illustrates an example architecture of a distributed storage system that provides real-time localized data access from different non-source storage nodes in accordance with some embodiments presented herein.

The following detailed description refers to the accompanying drawings. The same reference numbers in different drawings may identify the same or similar elements.

Provided are systems and methods for real-time localized access to remote data that may be stored across different storage nodes. The real-time localized access may include intelligently and/or automatically moving data of a particular file and/or other pertinent files, that may be accessed in conjunction with the particular file, from a remote storage node to a local storage node prior to or in advance of the data being requested by a workstation at the local storage node so that the workstation may access the data from the local storage node without delay.

In some embodiments, the real-time localized access to the remote data may include dynamically transferring source control over different data and/or files to different storage nodes based on the frequency with which the data is accessed from the different storage nodes. The dynamic transfer of source control may cause the source copy of data to be stored at the storage node where that data is most frequently requested, thereby automatically localizing access to that data for a majority of access requests.

The real-time localized access may also include hierarchical tracking of the data stored in the distributed storage system, and block-based or record-based cache validation of cached data between non-source storage nodes and the source storage nodes. The hierarchical tracking may include dynamically updating the identification of the source storage nodes for different data in response to the transfer of source control for the different data between different storage nodes. The record-based cache validation may maximize the real-time localized distribution of cached data at a local storage node by invaliding records comprised of one or more blocks of particular file data cached at the local storage node, rather than all the cached particular file data, when only a chunk, part, or segment of the particular file changes. In other words, the local storage node may continue to serve, from local cache, records with different blocks of the particular file data that have not been affected by a change or update to the particular file without retrieval from a source storage node.

The real-time localized access may also use a hybrid push and pull prefetching to populate the caches of non-source local storage nodes. The hybrid push and pull prefetching may include prefetching not only additional data of a requested file, but also data of other pertinent files that are most frequently requested with the file in a given session with a workstation. For instance, a non-source storage node may pull into cache data of a first set of related files that are most commonly accessed with the requested file based on request patterns tracked by the non-source storage node, and the source storage node may push a second set of related files into the cache of the non-source storage node based on request patterns tracked by the source storage node. In particular, the source storage node may push identifiers for the second set of related files or records for the second set of related files into a prefetch queue of the non-source storage node, the non-source storage node may prioritize the prefetch queue based on cache availability, prior demand, and/or other criteria, and may prefetch one or more records for the second set of related files.

FIG. 1 illustrates an example architecture of distributed storage system 100 providing real-time localized data access in accordance with some embodiments presented herein. Distributed storage system 100 may include controllers 101-1, 101-2, and 101-3 (sometimes collectively referred to as "controllers 101" or individually as "controller 101") and storage nodes 103-1, 103-2, and 103-3 (sometimes collectively referred to as "storage nodes 103" or individually as "storage node 103") at different geographic and/or network locations.

Distributed storage system 100 may provide a unified namespace with which workstations may access the data that is stored across storage nodes 103. Workstations may include devices or systems that read, write, and/or access the data that is stored across storage nodes 103 of distributed storage system 100 based on directory paths and/or identifiers within the unified namespace. Workstations may connect to a closest, geographically proximate, or particular storage node 103 via the distributed file system interface, and may submit access requests (e.g., read and write operations) via the file system interface. The access requests may initially pass to controller 101 of the closest, geographically proximate, and/or particular storage node 103.

In some embodiments, each controller 101 may operate as part of the distributed file system through which workstations submit read, write, and/or other access requests to distributed storage system 100, or may operate separate from the file system. In some embodiments, controller 101 may be local to and/or running on the same machine or device as a storage node 103. For instance, first controller 101-1 may run as part of or in conjunction with first storage node 103-1. In some embodiments, controllers 101 may be connected to storage nodes 103 with high speed and/or high bandwidth interfaces. Interfaces for directly connecting controllers 101 to storage nodes 103 may include advanced technology attachment ("ATA"), small computer system interface ("SCSI"), serial attached SCSI ("SAS"), peripheral component interconnect express ("PCIe"), and/or the like.

Different controllers 101 and/or different storage nodes 103 may be connected to one another via a data network, and may be accessed via different network addressing assigned to each controller 101 and/or each storage node 103. The data network may include a packet-switched data network, a Local Area Network ("LAN"), a Wide Area Network ("WAN"), or network of networks (e.g., the Internet). The data network may support gigabit speeds (e.g., 1, 10, 100 gigabits per second). Ethernet, fiber channel, and/or other networking technologies may be used to connect controllers 101, storage nodes 103, and workstations to one another.

Controllers 101 may include modules or components for accessing data from storage nodes 103, for controlling the data that is cached and/or stored to each storage node 103, and/or for responding to workstation requests with the requested data. In some embodiments, controllers 101 may dynamically transfer source control over different files, content, and/or data to different storage nodes 103 based on data access frequency from different workstations, geographic locations, and/or network locations, and may provide a dynamic access hierarchy for accessing different data from the correct storage node 103 with source control over that data. Specifically, controllers 101 may coordinate amongst one another to store a source copy of particular data on a single storage node 103 that becomes designated as the source storage node of distributed storage system 100 for that particular data. The particular data may include all data of a particular file or records that include different subsets of the particular file data. Other controllers 101 and/or non-source storage nodes 103 may receive, cache, and/or distribute copies of that particular data, but each such copy is retrieved and/or validated against the source copy stored by the source storage node 103 having source control over that particular data. The stored data may include different parts of different files, streams, media, content, applications, services, etc.

Additionally, in some embodiments, controllers 101 may perform the hybrid pull and push data prefetching in order to provide real-time localized access to different sets of data from different non-source storage nodes 103. For instance, first controller 101-1 may track request patterns of a localized set of workstations connected to first storage node 103-1, and second controller 101-2 may track request patterns of a different localized set of workstations connected to second storage node 103-2. From the tracked request patterns, first controller 101-1 may determine that a first set of files is most frequently requested after a particular file, and second controller 101-2 may determine that a different second set of files is most frequently requested after the particular file. Accordingly, in response to first controller 101-1 receiving a request for the particular file, first controller 101-1 may request the particular file and may perform a pull-based prefetching of the first set of files from second controller 101-2 of second storage node 103-2 that has source control over the particular file and the first set of files. Second controller 101-2 may provide data of the particular file and the first set of related files, and may also perform a push-based prefetching of the second set of files to first controller 101-1.

Each storage node 103 may be located at a different physical site, network location, and/or geographic location. Each storage node 103 may include one or more storage devices. For instance, each storage node 103 may include one or more solid state disks, flash memory, optical storage devices, magnetic disks, storage devices that write to physical media, mechanical storage devices, and/or storage devices that store and/or access data with or without moving components.

In some embodiments, the memory and/or storage of each particular storage node 103 may be partitioned for caching and storage. In particular, the memory and/or storage of each particular storage node 103 may be used to cache data for a first set of files that the particular storage node 103 does not have source control over (e.g., is non-source storage node for the first set of files), and to store original or source data for a second set of files the particular storage node 103 has source control over (e.g., is a source storage node for the second set of files).

In some embodiments, a first set of storage nodes 103 may have source control over all data stored to distributed storage system 100, and a different second set of storage nodes 103 may be used to provide real-time localized access to that data by caching and distributing copies of the data to requesting workstations. For instance, first storage node 103-1 may be located near a company headquarters, and second storage node 103-2 may be located near a small satellite office. Frequency of data access from the small satellite office may not reach the frequency of data access at first storage node 103-1. Accordingly, first storage node 103-1 may have source control over the data, while second storage node 103-2 caches and serves a subset of the data to workstations operating in the small satellite office.

Storage nodes 103 may cache, store, and/or distribute file data in records and/or blocks. For instance, the data for a particular file may be stored across a set of non-sequential blocks of one or more storage devices of a particular storage node 103. The set of non-sequential blocks may correspond to a single record. As will be discussed in detail below, controllers 101 may use a dynamic access hierarchy to identify storage nodes 103 with source control over different data, and to access the record that stores data for a particular file from the identified source storage nodes 103.

Distributed storage system 100 may scale to include any number, combination, and/or type of storage nodes 103. In other words, the aggregate storage footprint provided by storage nodes 103 may be increased or decreased as needed.

Figure 2:
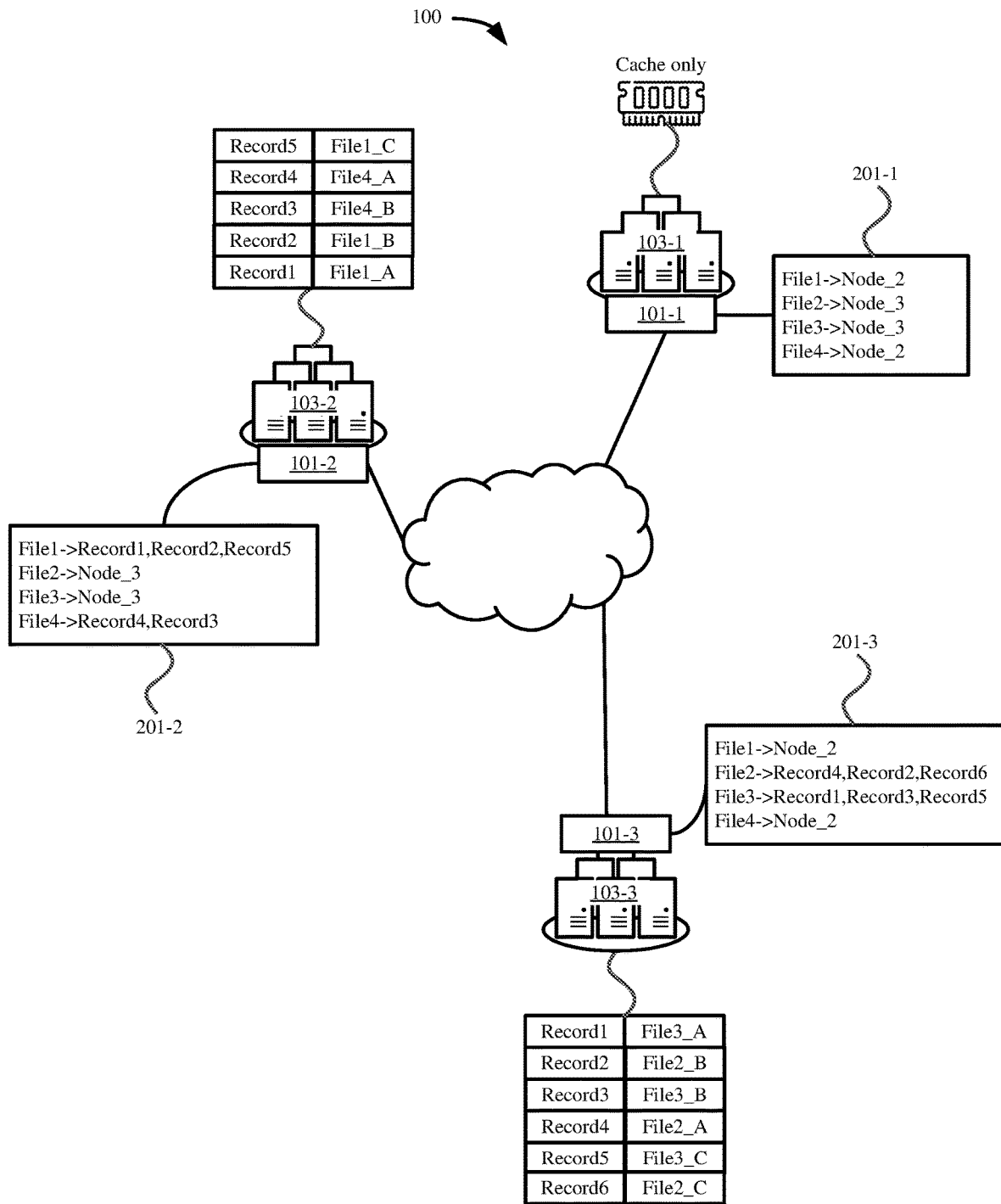
FIG. 2 illustrates an example of the dynamic access hierarchy used to identify storage nodes with source control over different data in accordance with some embodiments presented herein.

FIG. 2 illustrates an example of the dynamic access hierarchy used by controllers 101 to identify storage nodes 103 with source control over different data in accordance with some embodiments presented herein. As shown in FIG. 2, each controller 101 may maintain its own access hierarchy table 201. For instance, first controller 101-1 of first storage node 103-1 may store access hierarchy table 201-1, second controller 101-2 of second storage node 103-2 may store access hierarchy table 201-2, and third controller 101-3 of third storage node 103-3 may store access hierarchy table 201-3.

Each access hierarchy table 201 may include different entries for data that storage node 103 of controller 101 has source control over and that another storage node 103 has source control over. For instance, first storage node 103-1 in FIG. 2 may be used purely as a cache and may not have source control over any data. Accordingly, access hierarchy table 201-1 of first controller 101-1 may include a first identifier for different data that may be accessed from other storage nodes 103 of distributed storage system 100, and may further include a second identifier for controller 101 or storage node 103 with source control over the data identified by the first identifier.

The first identifier may provide a value for identifying, requesting, and accessing particular data within distributed storage system 100. In some embodiments, the first identifier may map to a directory, access, and/or other path for uniquely identifying the particular data in the distributed file system or unified namespace of distributed storage system 100. For example, the first identifier may be defined as "~/customer1/project1/images/image_X.jpg".

To indicate that storage node 103-1 does not have source control and/or is not a source storage node for any of the data stored in distributed storage system 100, each second identifier in access hierarchy table 201-1 may provide a unique identifier for the controller 101 and/or storage node 103 that has source control over the data identified by the corresponding first identifier. Accordingly, the second identifier may include an Internet Protocol ("IP") address, Uniform Resource Locator ("URL"), or other path to a remote controller 101 (e.g., controller 101 other than first controller 101-1) or remote storage node 103 (e.g., storage node other than first storage node 103-1). In any case, the first identifier is different than the second identifier.

To indicate that a storage node 103 has source control over particular data, the second identifier for the particular data in access hierarchy table 201 may provide the storage location for the particular data on that storage node 103. For instance, second storage node 103-2 may have source control of a first file, and access hierarchy table 201-2 of second controller 101-2 may include an entry with a first identifier that identifies the first file and a second identifier with a list of records where data for the first file is stored on second storage node 103-2. In some embodiments, the list of records may identify storage blocks on one or more storage devices of second storage node 103-2 that store the first file, and/or the partitioning of different chunks or parts of the first file to specific storage locations or storage units of the one or more storage devices. In some embodiments, the second identifier may correspond to a file allocation table mapping or block allocation table mapping of file data to one or more storage devices of storage node 103 when that storage node 103 is the source storage node for that file.

Accordingly, each particular controller 101 may track the exact storage location of data on a local storage node 103 that has source control over that data, and may track the identifier of a remote storage node 103 that has source control over other data. As shown in FIG. 2, access hierarchy table 201-2 of second controller 101-2 may map the exact storage location for data of a first file and a fourth file across second storage node 103-2, and may identify third storage node 103-3 as the source storage node with source control over a second file and a third file. Access hierarchy table 201-3 of third controller 101-3 may map the exact storage location for data of the second file and the third file across third storage node 103-3, and may identify second storage node 103-2 as the source storage node with source control over the first file and the fourth file.

In some embodiments, controllers 101 may build and update access hierarchy tables 201 based on messaging that is directly exchanged between controllers 101. When a new file or data is uploaded or written to a particular storage node 103, that particular storage node 103 may automatically be granted source control over that new file or data and become the designated source storage node within distributed storage system 100 for that new file or data. Controller 101 for the particular storage node 103 may broadcast or otherwise distribute messaging to other controllers 101 in distributed storage system 100 that identifies the first identifier with which workstations may request or access the new file or data, and the second identifier of the particular storage node 103 having source control over the new file or data. Controller 101 for the particular storage node 103 may also update its own access hierarchy table 201 with an entry comprising the first identifier and a different second identifier that lists the blocks or locations of the particular storage node 103 storing the new file or data.

Designating a single storage node 103 as the source storage node for different data and/or different file accessed from distributed storage system 100 may ensure that distributed storage system 100 retains only one source copy of the data or file. All cached copies of the data or file may be validated against the source data or source file at the source storage node.

When data is requested and/or accessed from a non-source storage node, the source storage node may place a read or write lock on the data. The lock may ensure that only one workstation, user, or system may modify the data at any given time.

Control over particular data may be transferred from one storage node 103 to another storage node 103 based on the frequency with which the particular data is requested from different storage nodes 103. Controllers 101 may transfer source control and change the source storage node that is designated for particular data in order to localize access of the particular data at the storage node where the particular data is most frequently accessed.

Figure 3:
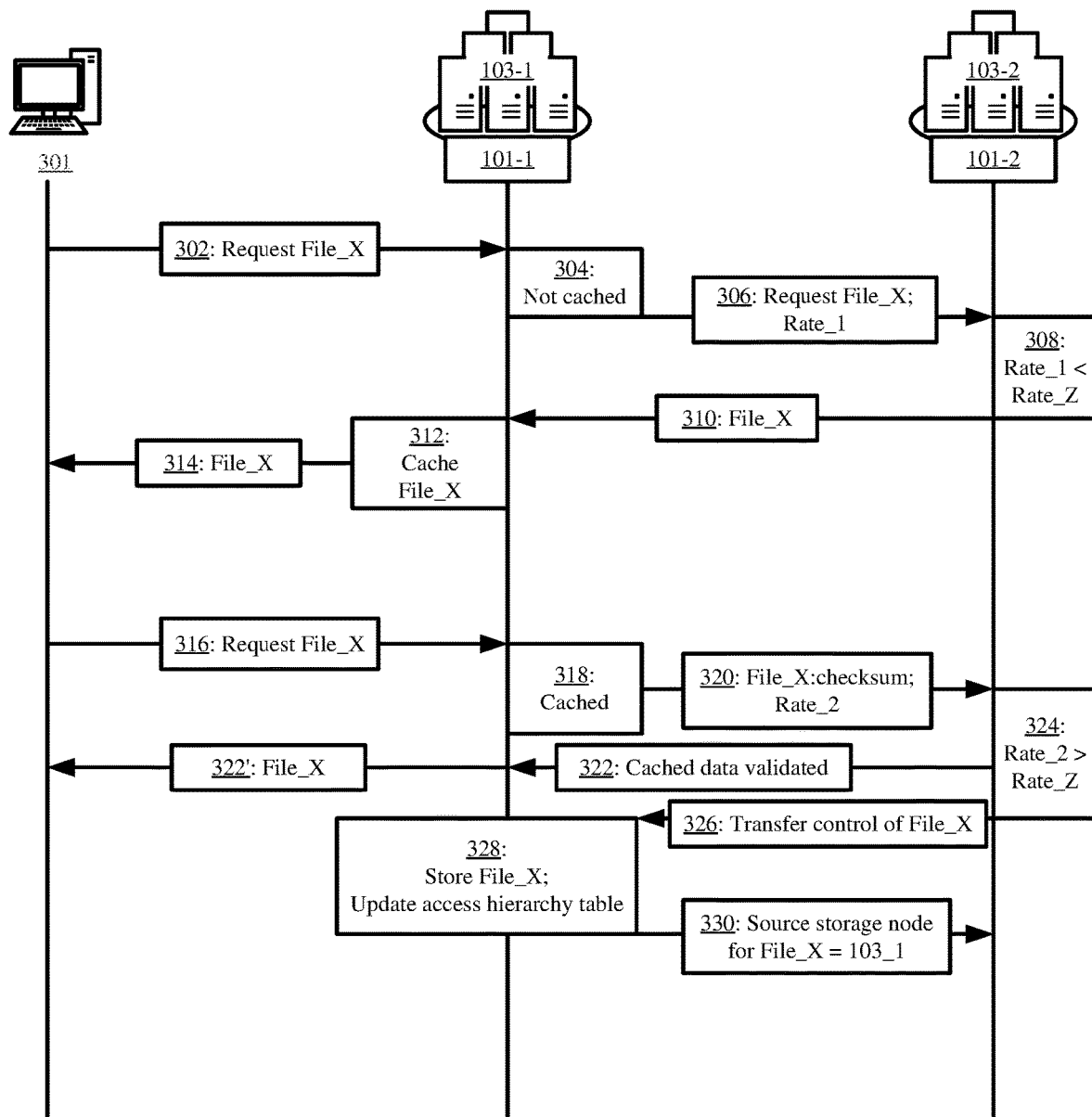
FIG. 3 illustrates an example of transferring control of different data between different storage nodes of the distributed storage system in accordance with some embodiments presented herein.

FIG. 3 illustrates an example of controllers 101 transferring control of different data between different storage nodes 103 of distributed storage system 100 in accordance with some embodiments presented herein. FIG. 3 illustrates interactions between workstation 301, first controller 101-1 of first storage node 103-1, and second controller 101-2 of second storage node 103-2.

In some embodiments, workstation 301 may include a user device that is located at the same site or near first storage node 103-1. In some other embodiments, workstation 301 may include a user device that is configured to access data from distributed storage system 100 via first storage node 103-1. In some such embodiments, workstation 301 may connect to distributed storage system 100 using a file system that establishes a direct interface with first controller 101-1.

Workstation 301 may issue (at 302) a request to access data of a particular file (e.g., "file_X"). For instance, workstation 301 may issue a read request or a write request that includes a directory path for uniquely identifying the particular file in the collective namespace of distributed storage system 100, wherein the directory path is agnostic and/or does not identify which storage node 103 retains the source copy of the particular file. The request may pass from workstation 301 to first controller 101-1. In particular, the request may pass from workstation 301 to first controller 101-1 when first controller 101-1 and/or first storage node 103-1 are the closest access point of distributed storage system 100 to workstation 301, or when workstation 301 establishes a network connection to a distributed file system, and the distributed file system routes the request to first controller 101.

First controller 101-1 may query first storage node 103-1, and may determine (at 304) that a copy of the requested data is not stored in cache of first storage node 103-1. Accordingly, first controller 101 may inspect the access hierarchy table, may determine that second storage node 103-2 has source control over the requested data for the particular file, and may request (at 306) the data of the particular file from second controller 101-2 of second storage node 103-2. First controller 101-1 may include, with the request, a current rate or a number of times the particular file has been requested at first storage node 103-1. In some embodiments, first controller 101-1 may track request rates or counts for different files or data that originate from workstations that are directly connected to first controller 101-1 and/or that directly access data from first storage node 103-1.

Second controller 101-2 may receive (at 306) the request from first controller 101-1, and may compare the request rate or number of requests for the particular file that originate at first storage node 103-1 to the request rate or number of requests for the particular file that originate at second storage node 103-2. In particular, second controller 101-2 may track request rates or counts for different files or data that originate from workstations that are directly connected to second controller 101-2 and/or that directly access data from second storage node 103-2.

Second controller 101-2 may determine (at 308) that the particular file is more frequently accessed from second storage node 103-2 than from first storage node 103-1 based on the comparison. Accordingly, second controller 101-2 may retain source control over the particular file. No change is made to the access hierarchy tables, and other storage nodes 103 of distributed storage system 100 may continue to identify second storage node 103-2 as the source storage node from which to retrieve updated and valid data for the particular file.

In response to the request from first controller 101-1, second controller 101-2 may retrieve the requested data for the particular file from second storage node 103-2. In particular, second controller 101-2 may inspect its access hierarchy table to determine the one or more storage devices of second storage node 103-2 and the records that point to the specific storage blocks of the one or more storage device that store the requested data of the particular file, and may provide (at 310) first controller 101-1 with a copy of the requested data.

First controller 101-1 may cache (at 312) the particular file data in first storage node 103-1. First controller 101-1 may provide (at 314) the particular file data to workstation 301.

At a later time, workstation 301 (e.g., the same or a different workstation) may submit (at 316) a second request for the same data or other data of the particular file to first controller 101-1. For instance, workstation 301 may write back updated values for the data, or may request subsequent data of the particular file that may have been prefetched and cached to first storage node 103-1.

In any case, first controller 101-1 may determine (at 318) that the data requested in the second request is cached at first storage node 103-1. First controller 101-1 may also inspect the access hierarchy table to further determine that second storage node 103-2, and not first storage node 103-1 of first controller 101-1, manages the original or source copy of the particular file. Accordingly, first controller 101-1 may validate the cached data with second controller 101-2 and/or second storage node 103-2 to ensure that the cached data does not deviate from the original source data of the particular file.

To validate the cached data, first controller 101-1 may provide (at 320) second controller 101-2 with a cache validation request. The cache validation request may include a checksum, timestamp, or other value that is representative of the state of the cached data. The cache validation request may also include an updated request rate or number of times the particular file is requested from first storage node 103-1.

Second controller 101-2 may receive (at 320) the cache validation request, may determine that the checksum, timestamp, or other value is indicative of the cached data at first storage node 103-1 matching the source data stored by second storage node 103-2. Accordingly, second controller 101-2 may provide (at 322) a cache validation response that validates the cached data at first storage node 103-1.

Additionally, second controller 101-2 may compare (at 324) the request rate and/or number of requests for the particular file at first storage node 103-1 to the request rate and/or number of requests for the particular file at second storage node 103-2. This time, second controller 101-2 may determine (at 324) that the particular file is requested more frequently by workstations connected to first storage node 103-1 than workstations connected to second storage node 103-2, and may transfer control of the particular file to first storage node 103-1. Second controller 101-2 may provide a transfer control message (at 326) to first controller 101-1.

In response to the cache validation response, first controller 101-1 may serve (at 322') the data that is requested in the second request from workstation 301 and that is stored in first storage node 103-1 cache to workstation 301. In response to the transfer control message, first controller 101-1 may assume (at 328) control over the particular file by retrieving all data for the particular file from second storage node 103-2, storing the particular file data in long-term or non-volatile storage of first storage node 103-1, updating the access hierarchy table of first controller 101-1 to track the exact storage location of the particular file data on first storage node 103-1, and notifying (at 330) other controllers 101 of distributed storage system to update their access hierarchy tables to reflect the transition of the particular file from second storage node 103-2 to first storage node 103-1. In some embodiments, second controller 101-2 may additionally or alternatively provide controllers 101 of the transfer of control over the particular file from second storage node 103-2 to first storage node 103-1.

Subsequent requests to access the particular file data that are issued to first controller 101-1 may be served directly from the source copy of the particular file data in first storage node 103-1 without validation with second storage node 103-2. Additionally, requests for the particular file data that are directed to other controllers 101 or storage nodes 103 may be forwarded to first controller 101-1 for validation and/or copies of the source data.

In this manner, controllers 101 may automatically shift stored data to storage nodes 103 where that data is most frequently accessed. In doing so, controllers 101 localize data access for a majority of requests and/or workstations that frequently access that data.

The caching and cache validation localizes the data for other workstations that access the same data less frequently from other network locations or other storage nodes 103. Nevertheless, the caching may incur a retrieval delay the first time data is requested from a storage node 103 that does not have source control over that data, or whenever the cached data is changed and an updated copy of the data has to be retrieved from the source storage node 103.

To minimize the delay and/or penalty associated with cached data being invalidated at a non-source storage node 103, some embodiments perform a record-based caching and validation of data that mirrors the record-based storage and/or management of the data at a source storage node 103. The record-based caching and validation allows a non-source storage node 103 to retain and localize access to different cached data of a file that has not changed while replacing the records or parts of the cached data that have changed with updated source data from corresponding records stored and/or maintained at the source storage node 103.

Figure 4:
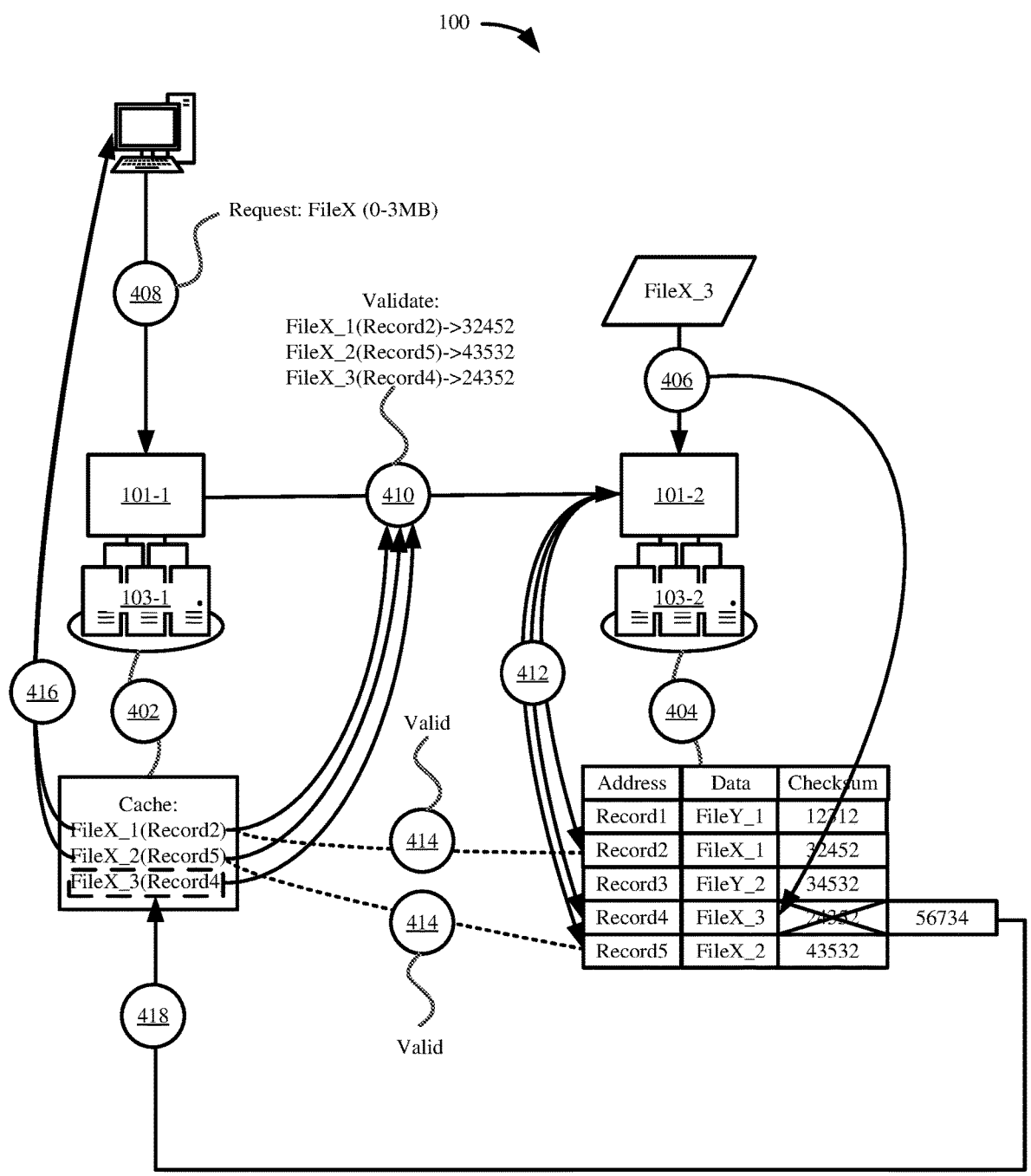
FIG. 4 illustrates an example of block-based caching and validation of data in accordance with some embodiments presented herein.

FIG. 4 illustrates an example of the record-based caching and validation of data in accordance with some embodiments presented herein. As shown in FIG. 4, first storage node 103-1 may cache (at 402) three data records of a particular file. Each data record may include of a subset of the data that forms the particular file. In particular, each data record may include or map to a subset of storage blocks that store a different subset of data for the particular file. Second storage node 103-2 may be the source storage node for the particular file, and may store (404) all six records of source data that form the particular file. The cached three data records of the particular file at first storage node 103-1 may correspond directly to three of the six records of source data stored by second storage node 103-2. For instance, second storage node 103-2 may store file data in 1 Megabyte ("MB") records. When caching the three data records of the particular file retrieved from second storage node 103-2, first storage node 103-1 may keep each 1 MB record separate in cache. Additionally, first storage node 103-1 may store a record identifier for each cached record. In some embodiments, the record identifier for a data record cached by first storage node 103-1 may correspond to the storage location or address for that same data record at second storage node 103-2. In some embodiments, the record identifier may be stored in metadata of each cached record.

After caching the three data records of the particular file at first storage node 103-1, the third storage record of the particular file may be updated (at 406) and/or changed at second storage node 103-2 as a result of the data or one or more storage blocks encompassed by the third storage record changing. After the update to the particular file, first controller 101-1 may receive (at 408) a request for a particular byte range of the particular file from a workstation. The particular byte range may include the 3 MBs of the particular file cached by first storage node 103-1.

First controller 101-1 may query first storage node 103-1 to determine that the requested data is cached, and may validate the cached data before responding to the request with the cached data. Rather than compute a single checksum for all the cached data of the particular file, first controller 101-1 may compute a checksum for each record, and may issue (at 410) a cache validation request to second storage node 103-2 for each cached record of the particular file. Each cache validation request may include the checksum computed from the data of a different cached record, and the record identifier stored for that cached record.

Second controller 101-2 may receive the cache validation requests from first controller 101-1, and may examine (at 412) second storage node 103-2 to determine if the data records cached by first storage node 103-1 remain valid. In particular, second controller 101-2 may use the record identifier from a cache validation request to retrieve or compute the checksum for the source data stored at the identified record of second storage node 103-2. If the checksum from the cache validation request matches the checksum of the source data at the identified record identifier, second controller 101-2 may notify first controller 101-1 of the validated cached data.

As shown in FIG. 4, second controller 101-2 may validate (at 414) the first two cached data records of the particular file at first storage node 103-1, and first controller 101-1 may respond (at 416) to the workstation request by directly serving the first two cached records of the particular file from first storage node 103-1. However, the third cached record of the particular file at first storage node 103-1 may be invalidated due to the checksum mismatch, and first controller 101-1 may retrieve (at 418) only the data for the third record of the particular file from second storage node 103-2 while continuing to serve (at 416) the first two cached records.

Accordingly, the delay experienced by workstations accessing the particular file data from first storage node 103-1 as a result of the update to the particular file at second storage node 103-2 and the invalidated cache of first storage node 103-1 is effectively eliminated by the record-based caching and validation implementation illustrated in FIG. 4. Specifically, first storage node 103-1 does not have to invalidate all the cached data for the particular file because one part of the particular file was changed at the source storage node. Instead, the record-based caching and validation allows the first storage node 103-1 cache to mirror the storage records of second storage node 103-2 storing the source data for the particular file, and to replace only the records that change based on the mirroring of the second storage node 103-2 records in the cache of first storage node 103-1.

To further reduce and/or eliminate nearly all retrieval delay, controllers 101 may perform a hybrid pull and push data prefetching. In some embodiments, the hybrid pull and push data prefetching may populate non-source storage node cache with requested data for a particular file, additional data of the particular file that was not requested by a workstation but that is expected to be requested at a later time, a first set of files that are different than the particular file and that are frequently accessed by workstations accessing the particular file from the particular non-source storage node, and/or a second set of files that are different than the particular file and that are frequently accessed by workstations accessing the particular file from the source storage node for the particular file. In some embodiments, the hybrid pull and push data prefetching may include using request patterns for a requested file at the non-source storage node to pull into cache a first set of files from the source storage node that are frequently accessed with the requested file at the non-source storage node, and using different request patterns for the requested file at the source storage node to push from the source storage node into cache of the non-source storage node a second set of files that are frequently accessed with the requested file at the source storage node.

Accordingly, when a workstation requests data of a particular file that is not cached at a non-source storage node, the workstation may experience an initial delay as the non-source storage node retrieves the requested data from a remote source storage node. However, subsequent access by the workstation to additional data of the particular file or data of related files may not experience any such delay and may be served in real-time from local cache of the non-source storage node as a result of the hybrid pull and push data prefetching.

Figure 5:
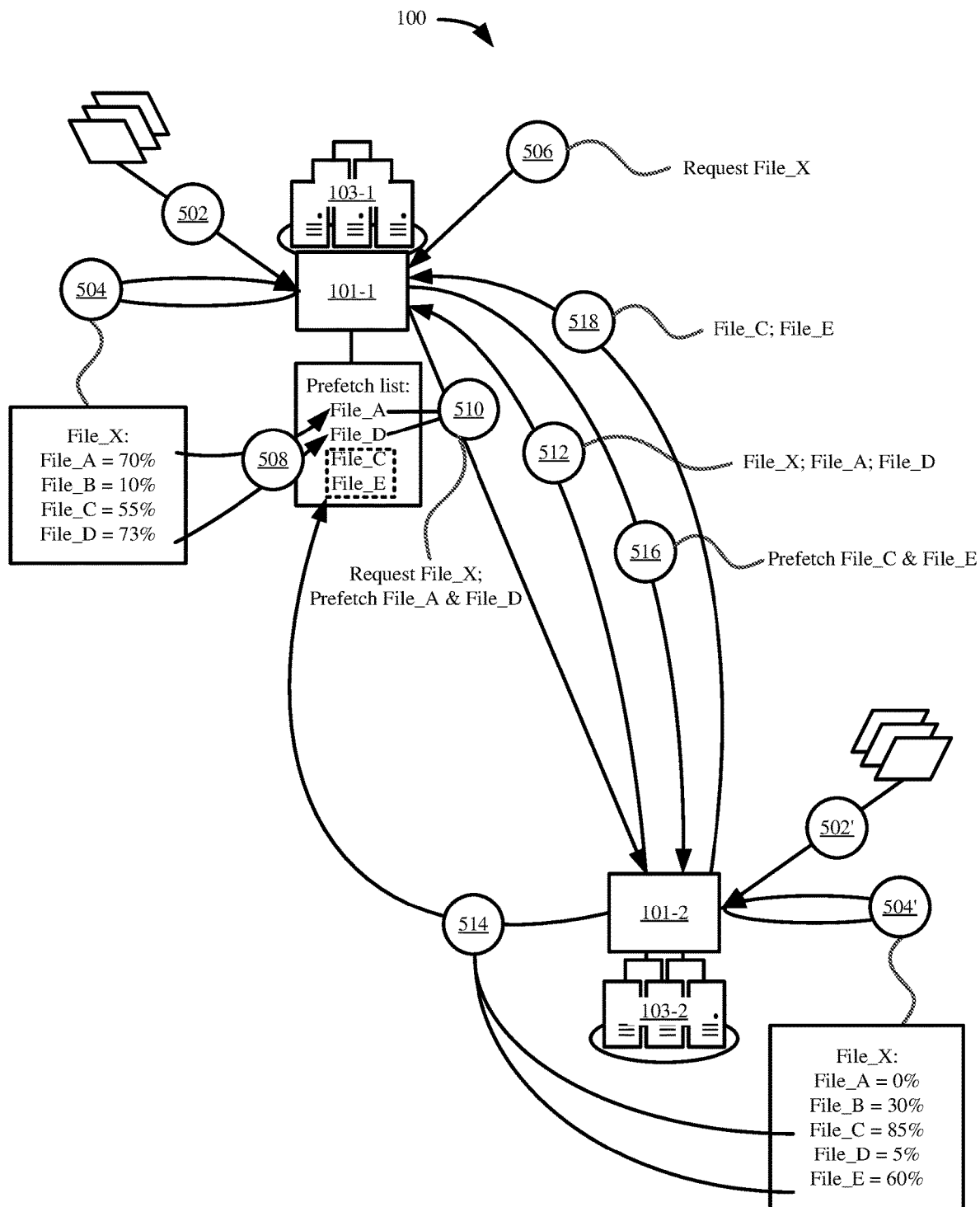
FIG. 5 illustrates an example of hybrid pull and push data prefetching in accordance with some embodiments presented herein.

FIG. 5 illustrates an example of the hybrid pull and push data prefetching in accordance with some embodiments presented herein. As shown in FIG. 5, the hybrid pull and push data prefetching may be between first controller 101-1 of a first storage node 103-1 and second controller 101-2 of a second storage node 103-2, wherein first storage node 103-1 is a non-source storage node for a particular file, and wherein second storage node 103-2 is a source storage node for the particular file. The hybrid pull and push data prefetching may be implemented between any two controllers 101 and/or storage nodes 103 of distributed storage system 100.

First controller 101-1 may track (at 502) access patterns of a first set of workstations that may access data of distributed storage system 100 directly from first storage node 103-1. For instance, first controller 101-1 may monitor different sessions that are established between distributed storage system 100 and the first set of workstations. A workstation may establish a session by creating a network connection to the distributed file system and by issuing a first request for first data. The distributed file system may provide the first request to first controller 101-1. First controller 101 may track (at 502) an access pattern by logging subsequent data that is requested and/or accessed by the workstation after the first data. In some embodiments, first controller 101-1 may construct access trees or linked lists that identify different data or files that are accessed during a particular session. For example, a workstation may first access a particular project file, may then access a particular video file, a set of thumbnails, and an edit decision list ("EDL") file. In this example, first controller 101 may key an access pattern on the particular project file, and may include the particular video file, the set of thumbnails, and the EDL file as data that is accessed in conjunction with the particular project file.

First controller 101-1 may compare access patterns that are keyed on the same data or file and/or that include some of the data or files to model (at 504) different probabilities that certain data and/or files will be accessed after particular file data or a particular file. For instance, first controller 101-1 may determine from the access patterns tracked for first storage node 103-1 that a first file is accessed every time a particular file is accessed, and that a second file is accessed half the time the particular file is accessed. Accordingly, first controller 101-1 may compute the probability of the first file being accessed with the particular file to be 100%, and the probability of the second file being accessed with the particular file to be 50%. From the derived probabilities, first controller 101-1 may determine a set of files that are most frequently requested after particular data or a particular file is requested and/or accessed. For instance, the set of files may include two or more files with a threshold probability (e.g., probability greater than 75%) of being accessed after the particular file, or a particular number of files (e.g., 4 files) that have the highest probability of being accessed after the particular file.

First controller 101-1 may receive (at 506) an access request for data of a particular file from a workstation. The access request may be a read operation or a write operation that includes a path or other identifier for accessing the particular file data and/or a byte range for the specific data to access from the particular file.

First controller 101-1 may determine that the particular file data is not cached at first storage node 103-1, and that second storage node 103-2 is the source storage node with source control over the particular file data. Accordingly, first controller 101-1 may perform a retrieval operation to retrieve the particular file data from second storage node 103-2. Additionally, first controller 101-1 may perform a pull-based prefetching of data for other files that may be accessed with the particular file data as determined from the tracked (at 502) access patterns and modeled (at 504) probabilities by first controller 101-1.

First controller 101-1 may determine (at 508) a first set of data from a first set of files that are frequently accessed with the particular data from first storage node 103-1 based on the tracked (at 502) access patterns and modeled (at 504) probabilities. As shown in FIG. 5, first controller 101-1 may select the first set of files to include two files that are accessed with the highest probability or frequency with the particular file data in the same session.

First controller 101-1 may add (at 508) the first set of files to a prefetch list and/or queue, and may issue (at 510) an access request for the particular file data with a set of prefetch requests for the first set of data from the first set of files to second controller 101-2 of second storage node 103-2. For instance, the particular file and the first set of files may include files of a particular project stored with second storage node 103-2 or files stored in a common directory that second storage node 103-2 has source control over. In some embodiments, the set of prefetch requests may request one or more of a first record, a last record, and/or a most frequently accessed record of each file in the first set of files.

Second controller 101-2 may complete the pull-based portion of the data prefetching by retrieving the particular file data and the first set of data from second storage node 103-2, and by providing (at 512) the retrieved data to first controller 101-1. As noted above, the first set of data may include additional unrequested data of the particular file as well as data of other files that first controller 101-1 determined to prefetch in conjunction with the requested data of the particular file. First controller 101-1 may enter the particular file data and the first set of file data into cache of first storage node 103-1.

Second controller 101-2 may also perform the push-based prefetching. Since second controller 101-2 and second storage node 103-2 have source control over the particular file, second controller 101-2 may receive more requests for the particular file directly from workstations than first controller 101-1, and may track (at 502') different request patterns for how workstations access the particular file from second storage node 103-2. Second controller 101-2 may model (at 504') probabilities with which different files and/or data are accessed with the particular file in different sessions with workstations that directly request the particular file from second storage node 103-2. Second controller 101-2 may determine a second set of data from a second set of files that is most frequently requested with the particular file data based on the tracked access patterns (at 502') and modeled (at 504') probabilities, and the second set of data and/or the second set of files maybe different than the first set of data and/or the first set of files identified by first controller 101-1.

To initiate the push-based prefetching of the second set of data, second controller 101-2 may remotely access and modify (at 514) the prefetch queue of first controller 101-1. Second controller 101-2 may add (at 514) entries for the second set of data and/or the second set of files to the prefetch queue of first controller 101-1 via a set of network messages second controller 101-2 passes to first controller 101-1.

In response to the entries that second controller 101-2 adds (at 514) to the prefetch queue of first controller 101-1, first controller 101-1 may prioritize the prefetch queue. For instance, first controller 101-1 may use the request patterns and/or criteria that are stored at first controller 101-1 to determine which data in the prefetch queue to prefetch first. Additionally, first controller 101-1 may inspect local cache to determine available storage and/or cache of first storage node 103-1, and may decide how much data from the prefetch queue to retrieve from second storage node 103-2 based on the cache availability. In other words, first controller 101-1 may selectively issue (at 516) prefetch requests for the second set of data to second controller 101-2. Second controller 101-2 may retrieve the second set of data from second storage node 103-2, and may provide (at 518) the second set of data to first controller 101-1. First controller 101-1 may enter the second set of data to the cache of first storage node 101-2.

FIG. 5 illustrates the hybrid pull and push prefetching being initiated in response to first controller 101-1 receiving a request for the particular file data. As part of the hybrid pull and push data prefetching, first controller 101-1 requests and retrieves the particular file data along with the first set of data from the first set of files from second storage node 103-2 that first controller 101-1 determines to be relevant to the particular file based on request patterns tracked at first storage node 103-1. Also, as part of the hybrid pull and push data prefetching, second controller 101-2 pushes updates to first controller 101-1 that cause first controller 101-1 to request and retrieve the second set of data from the second set of files from second storage node 103-2 that second controller 101-2 determines to be relevant to the particular file based on request patterns tracked at second storage node 103-2. Consequently, first controller 101-1 may respond to the original workstation request by providing the particular file data, and may prefetch the first set of data and the second set of data to first storage node 103-1 to increase the likelihood that data for subsequent requests received by first controller 101-1 will be localized at first storage node 103-1 and may be responded to in real-time without the delays associated with retrieving the data from second storage node 103-2.

Figure 6:
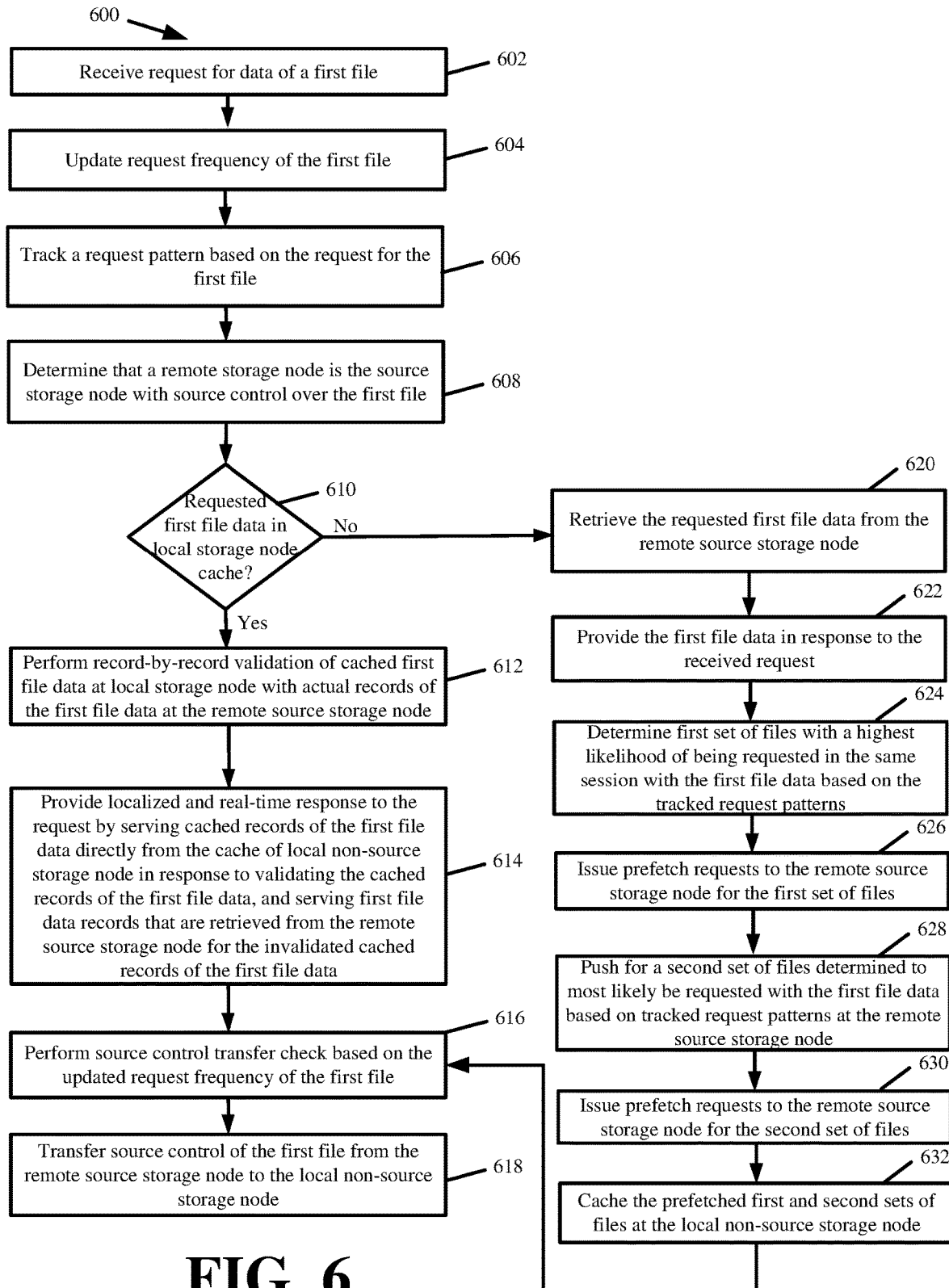
FIG. 6 presents a process for providing localized and real-time access to data in a distributed storage system in accordance with some embodiments presented herein.

FIG. 6 presents a process 600 for providing localized and real-time access to data in a distributed storage system in accordance with some embodiments presented herein. Process 600 may be implemented by different controllers 101 operating on different storage nodes 103 of distributed storage system 100.

Process 600 may include receiving (at 602) a request for data of a first file. The request may be issued by a workstation that connects to the distributed storage system from a first location that is closest to first storage node 103-1 and first controller 101-1. Accordingly, first controller 101-1 may receive (at 602) the request directly from the workstation. The request may specify a directory path, URL, or other identifier that uniquely identifies the first file in the file system namespace of distributed storage system 100. The request may specify a read, write, or other storage operation to perform on the first file, and may further specify a byte range of the first file that is requested.

Process 600 may include updating (at 604) a request frequency of the first file in response to the received (at 602) request. For instance, first controller 101-1 may track the number of times different files are requested over an interval of time, and may update (at 602) the tracked count for the first file in response to receiving (at 602) the request.

Process 600 may include tracking (at 606) a request pattern based on the request for the first file. In particular, first controller 101-1 may track (at 606) requests that came before or that come after the request for the first file from the same workstation or the same session established with the workstation.

Process 600 may include determining (at 608) that a remote storage node is the source storage node for the first file, wherein the remote source storage node is different than the local non-source storage node of first controller 101-1. The source storage node may be identified from the access hierarchy table that is maintained by first controller 101-1. For instance, first controller 101-1 may identify first storage node 103-1 as the source storage node when the access hierarchy table includes the exact storage location of the first file data (e.g., the records where the first file data is stored), and may identify another storage node 103 of distributed storage system 100 as the source storage node when the access hierarchy table includes a pointer, link, or other identifier to the other storage node 103.

Process 600 may include determining (at 610) if the requested first file data is stored in cache of local first storage node 103-1. For instance, first controller 101-1 may perform a cache inspection or cache look-up to quickly determine the presence or absence of the first file data in first storage node 103-1 cache.

In response to determining (at 610—Yes) that the first file data is locally cached, process 600 may include performing (at 612) the record-by-record validation of the cached first file data with the determined source storage node. As noted above, the record-by-record validation may include separately validating different cached chunks of the first file data. In particular, the local storage node (e.g., first storage node 103-1) may cache the first file data in records that mirror the records in which the first file data is stored on the remote source storage node. For instance, the cached first file data may include 1.5 MBs of total data, and may be stored as a first 1 MB record and a second 1 MB record with only half the second record populated with data to mirror the storage of the first file data in two records of remote source storage node. Accordingly, performing (at 612) the validation may include obtaining a checksum, timestamp, or other value that represents the contents of each cached record of the first file data, and providing the checksum, timestamp, or other value to the source storage node for validation against the contents of the record that stores the corresponding source data at the source storage node. In some embodiments, first storage node 103-1 may store the checksum, timestamp, or other value upon caching each record of the first file data, or may dynamically compute the value for validation. In any case, first storage node 103-1 may cache records of the first file data to match the format and structure with which the same records are stored, maintained, and/or accessed at the source storage node 103.

Process 600 may include providing (at 614) a localized and real-time response to the request by serving cached records of the first file data directly from the cache of local non-source storage node (e.g., first storage node 103-1) in response to validating the cached records of the first file data, and by retrieving invalidated cached records of the first file data from the remote source storage node to the local non-source storage node, updating the cache of the local non-source storage node to replace the invalidated cached records of the first file data with the retrieved cached records, and serving the retrieved records of the first file data to the requesting workstation.

Process 600 may include performing (at 616) a source control transfer check based on the updated (at 604) request frequency. For instance, as part of validating the cached records of the first file data, first controller 101-1 may provide the updated (at 604) request frequency for the first file at the local non-source storage node to second controller 101-2 of the remote source storage node. Process 600 may include transferring (at 618) source control of the first file from the remote source storage node to the local non-source storage node in response to the request frequency of the first file at the local non-source storage node being greater than the request frequency of the first file at the remote source storage node. Transferring (at 618) source control may include notifying controllers of distributed storage system 100 that local non-source storage node has become the source storage node for the first file, and updating the access hierarchy tables to reflect the transfer of control over the first file.

In response to determining (at 610—No) that the first file data is not locally cached at the local non-source storage node, process 600 may include retrieving (at 620) the first file data from the remote source storage node. In particular, first controller 101-1 may issue a request for the first file data to second controller 101-2 of the remote source storage node, and may receive records that represent the format and structure with which the first file data is stored on the remote source storage node, and/or may cache the received records of the first file data in the local non-source storage node to match the format and structure with which the same first file data is stored in different records of the remote source storage node. Process 600 may include providing (at 622) the first file data in response to the received (at 602) request.

In conjunction with retrieving (at 620) and/or providing (at 622) the first file data, process 600 may include performing the hybrid pull and push data prefetching. Performing the hybrid pull and push data prefetching may include determining (at 624) a first set of data and/or a first set of files with a highest likelihood of being requested in the same session with the first file data based on the request patterns tracked by the controller of the local non-source storage node and/or a modeling of the request patterns, and issuing (at 626) prefetch requests to the remote source storage node for the first set of data and/or the first set of files. Performing the hybrid pull and push data prefetching may further include pushing (at 628) into the prefetch table of the controller for the local non-source storage node (e.g., first controller 101-1), entries for prefetching a second set of data from a second set of files that the remote controller for the remote source storage node determines are most likely to be requested in the same session with the first file data based on the request patterns tracked by the controller of the remote source storage node. In response to the pushed entries, process 600 may include issuing (at 630) prefetch requests to the remote source storage node for the second set of data and/or the second set of files. Process may include caching (at 632) the first set of data and the second set of data that is prefetched from the remote source storage node in the cache of the local non-source storage node. Process 600 may include performing (at 616) the source control transfer check based on the updated (at 604) request frequency, and transferring (at 618) source control of the first file from the remote source storage node to the local non-source storage node in response to the request frequency of the first file at the local non-source storage node being greater than the request frequency of the first file at the remote source storage node.

Figure 7:
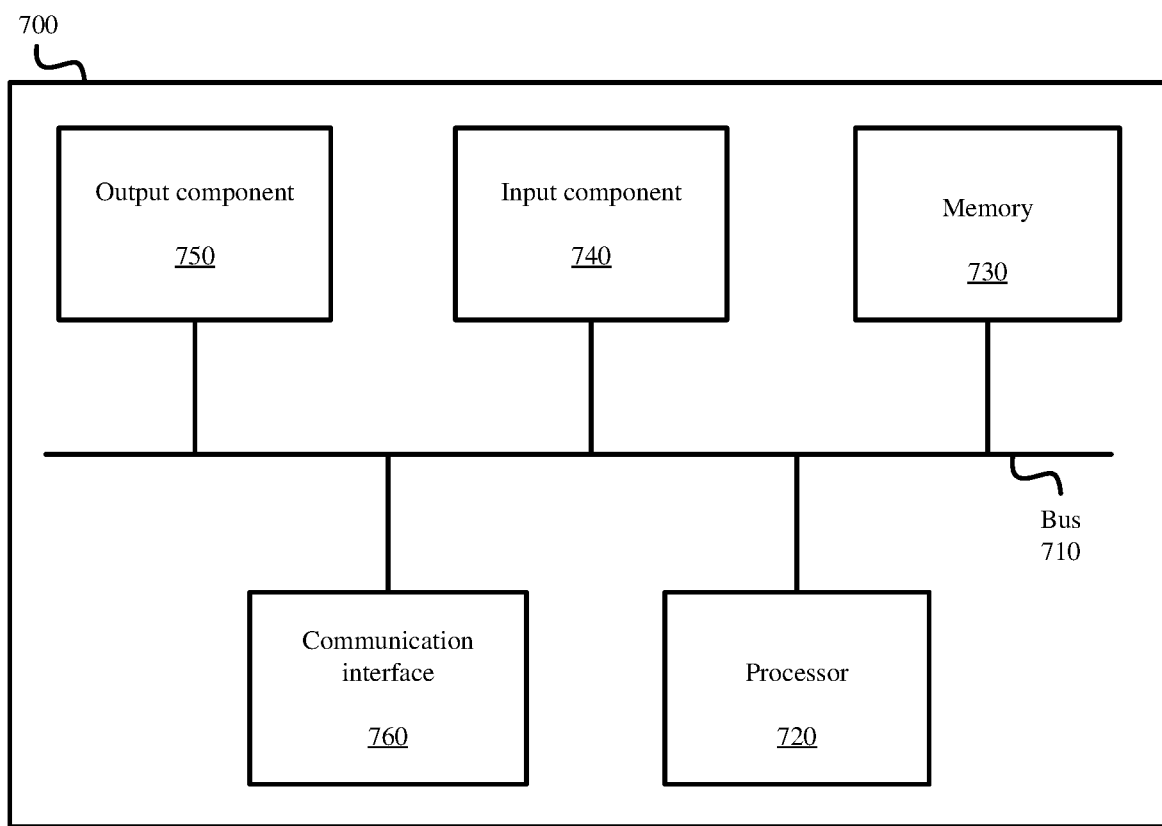
FIG. 7 illustrates example components of one or more devices, according to one or more embodiments described herein.

FIG. 7 is a diagram of example components of device 700. Device 700 may be used to implement one or more of the devices or systems described above (e.g., controller 101, storage nodes 103, distributed storage system 100, workstations, storage devices, the distributed file system, etc.). Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more light emitting diodes ("LEDs"), etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   tracking different access frequencies with which a particular file is directly accessed from a first storage node, a second storage node, and a third storage node of a distributed storage system, wherein each of the first storage node, the second storage node, and the third storage node operates from a different geographic location;
   storing a source copy of the particular file at the first storage node in response to the access frequency at the first storage node being greater than the access frequency at the second storage node and the access frequency at the third storage node;
   transferring the particular file from the first storage node to the second storage node and the third storage node in response to each of the second storage node and the third storage node receiving a first request for the particular file and the first storage node storing the source copy of the particular file;
   storing a cached copy of the particular file at each of the second storage node and the third storage node as a result of said transferring of the particular file;
   transferring control over the source copy of the particular file from the first storage node to the second storage node in response to the access frequency at the second storage node becoming greater than the access frequency at the first storage node and the access frequency at the third storage node;
   receiving a second request for the particular file at the third storage node; and
   validating the cached copy of the particular file at the third storage node against the source copy of the particular file at the second storage node in response to storing the cached copy of the particular file at the third storage node and transferring control over the source copy of the particular file from the first storage node to the second storage node.

2. The method of claim 1 further comprising:
   receiving an original request for the particular file at the first storage node prior to said transferring control over the source copy;
   providing the source copy of the particular file directly from the first storage node without validating the source copy in response to the original request;
   receiving a third request for the particular file at the first storage node after said transferring control over the source copy; and
   validating the source copy of the particular file at the first storage node against the source copy of the particular file at the second storage node before responding to the third request based on the first storage node transferring control over the source copy to the second storage node.

3. The method of claim 1 further comprising:
   providing the cached copy of the particular file directly from the third storage node in response to the second request after successfully validating the cached copy of the particular file against the source copy of the particular file at the second storage node.

4. The method of claim 3 further comprising:
   replacing the cached copy of the particular file at the third storage node, that was transferred from the first storage node, with the source copy of the particular file from the second storage node in response to unsuccessfully validating the cached copy of the particular file.

5. The method of claim 1 further comprising:
   providing a first set of messages from the first storage node across the distributed storage system at a first time when the first storage node has control over the source copy of the particular file;

updating an entry at the third storage node to identify the source copy of the particular file being stored at the first storage node in response to the first set of messages;
providing a second set of messages from the second storage node across the distributed storage system at a later second time when the second storage node has control over the source copy of the particular file; and
updating the entry at the third storage node to identify the source copy of the particular file being stored at the second storage node in response to the second set of messages.

6. The method of claim 1 further comprising:
generating an access hierarchy table entry for responding to requests received at the second storage node, wherein generating the access hierarchy table entry comprises entering a first identifier of the particular file and a second identifier of the first storage node as part of the access hierarchy table entry in response to storing the source copy of the particular file at the first storage node;
wherein transferring control over the source copy of the particular file comprises:
storing the source copy of the particular file to a first set of records of the second storage node; and
updating the access hierarchy table entry to identify the first set of records instead of the second identifier of the first storage node.

7. The method of claim 1,
wherein storing the source copy of the particular file at the first storage node comprises writing different data of the particular file to a first set of records of the first storage node; and
wherein storing the cached copy of the particular file at the third storage node comprises mapping the different data from the first set of records of the first storage node to a second set of records in cache of the third storage node that mirror the first set of records, wherein each record of the second set of records stores same data as a corresponding record of the first set of records.

8. The method of claim 7, wherein validating the cached copy comprises:
determining that data stored in a first subset of the second set of records at the third storage node does not deviate from data of the particular file;
distributing the data in the first subset of the second set of records in response to the second request; and
replacing data stored in a different second subset of the second set of records that deviates from the data of the particular file by retrieving the data stored in the second subset of the second set of records from the second storage node.

9. The method of claim 1 further comprising:
determining a first request pattern involving the particular file based on requests from a first set of workstations that pass directly to the first storage node;
prefetching a first set of files at the second storage node based on the first request pattern and said retrieving transferring of the particular file from the first storage node to the second storage node;
determining a different second request pattern involving the particular file based on requests from a second set of workstations that pass directly to the second storage node; and
prefetching a different second set of files at the second storage node based on the second request pattern and said transferring of the particular file from the first storage node to the second storage node.

10. The method of claim 1 further comprising:
tracking, at the first storage node, a first set of files frequently accessed with the particular file from the first storage node;
tracking, at the second storage node, a different second set of files frequently accessed with the particular file from the second storage node; and
wherein transferring the particular file comprises:
prefetching the first set of files from the first storage node to the second storage node in response to tracking, at the first storage node, the first set of files; and
prefetching the second set of files from the first storage node to the second storage node in response to tracking, at the second storage node, the second set of files.

11. The method of claim 10, wherein prefetching the second set of files comprises:
pushing the second set of files into a prefetch queue of the second storage node based on messaging originating from the first storage node; and
issuing a set of prefetch requests for the second set of files from the second storage node to the first storage node in response to pushing the second set of files into the prefetch queue of the second storage node.

12. The method of claim 1 further comprising:
providing localized access to the particular file from the third storage node by serving different records of data from the cached copy of the particular file in response to successfully validating each record of data with the second storage node.

13. The method of claim 1,
wherein storing the cached copy of the particular file comprises storing different data of the particular file to a plurality of records; and
wherein validating the cached copy of the particular file comprises:
providing a checksum for each record of the plurality of records to the second storage node;
determining that data from a particular record of the plurality of records does not deviate from corresponding data of the source copy based on the checksum of the particular record matching to a checksum derived from the corresponding data of the source copy that is stored to a record of the second storage node; and
distributing the data from the particular record in response to determining that the data from the particular record does not deviate from the corresponding data of the source copy.

14. The method of claim 1 further comprising:
generating an access hierarchy table at the first storage node with a plurality of first identifiers for each of a plurality of files accessible from the distributed storage system, and with a second identifier for each of the plurality of first identifiers,
wherein the second identifier for an associated first identifier comprises an address of another storage node based on the first storage node not controlling a source copy of a file identified by the associated first identifier, and
wherein the second identifier for the associated first identifier comprises a storage location of the first storage node based on the first storage node controlling a source copy of the file identified by the associated first identifier.

15. A distributed storage system comprising:
a first storage node;
a second storage node;
a third storage node;
a first controller of the first storage node configured to:
track an access frequency with which a particular file is directly accessed from the first storage node;
store a source copy of the particular file at the first storage node in response to the access frequency at the first storage node being greater than an access frequency with which the particular file is directly accessed at other storage nodes of the distributed storage system; and
transfer control over the source copy of the particular file from the first storage node to the third storage node in response to the access frequency at the third storage node becoming greater than the access frequency at the first storage node;
a second controller of the second storage node configured to:
transfer the particular file from the first storage node to the second storage node in response to a first request for the particular file and the first storage node storing the source copy of the particular file;
store a cached copy of the particular file at the second storage node as a result of said transferring of the particular file;
receive a message indicating said transfer of control over the source copy of the particular file from the first storage node to the third storage node;
receive a second request for the particular file; and
validate the cached copy of the particular file at the second storage node against the source copy of the particular file at the third storage node in response to storing the cached copy of the particular file at the second storage node and transferring control over the source copy of the particular file from the first storage node to the third storage node.

16. The distributed storage system of claim 15, wherein the first controller is further configured to:
receive an original request for the particular file at the first storage node prior to said transferring control over the source copy;
provide the source copy of the particular file directly from the first storage node without validating the source copy in response to the original request;
receive a third request for the particular file at the first storage node after said transferring control over the source copy; and
validate the source copy of the particular file at the first storage node against the source copy of the particular file at the third storage node before responding to the third request based on the first storage node transferring control over the source copy to the third storage node.

17. The distributed storage system of claim 15, wherein the second controller is further configured to:
provide the cached copy of the particular file directly from the second storage node in response to the second request after successfully validating the cached copy of the particular file against the source copy of the particular file at the third storage node.

18. The distributed storage system of claim 17, wherein the second controller is further configured to:
replace the cached copy of the particular file at the third storage node, that was transferred from the first storage node, with the source copy of the particular file from the third storage node in response to unsuccessfully validating the cached copy of the particular file.

19. The distributed storage system of claim 17, wherein the second controller is further configured to:
generate an access hierarchy table entry with a first identifier of the particular file and a second identifier of the first storage node in response to storing the source copy of the particular file at the first storage node;
store the source copy of the particular file to a first set of records of the second storage node in response to the first controller transferring control over the source copy of the particular file to the second storage node; and
update the second identifier of the access hierarchy table entry to identify the first set of records instead of the second identifier of the first storage node.

* * * * *